United States Patent
Suh et al.

(10) Patent No.: US 9,941,492 B2
(45) Date of Patent: Apr. 10, 2018

(54) FLEXIBLE SECONDARY BATTERY HAVING A BONDING PORTION EXTENDING IN A LENGTHWISE DIRECTION

(71) Applicant: Samsung SDI Co., Ltd., Yongin-si, Gyeonggi-do (KR)

(72) Inventors: Jun-Won Suh, Yongin-si (KR); Jeong-Doo Yi, Yongin-si (KR); Ju-Hee Sohn, Yongin-si (KR); Hyun-Hwa Song, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 343 days.

(21) Appl. No.: 14/519,096

(22) Filed: Oct. 20, 2014

(65) Prior Publication Data

US 2015/0171382 A1    Jun. 18, 2015

(30) Foreign Application Priority Data

Dec. 16, 2013 (KR) .................. 10-2013-0156642

(51) Int. Cl.
*H01M 2/02* (2006.01)
*H01M 2/14* (2006.01)
*H01M 2/08* (2006.01)

(52) U.S. Cl.
CPC ....... *H01M 2/0275* (2013.01); *H01M 2/0287* (2013.01); *H01M 2/08* (2013.01); *H01M 2/14* (2013.01)

(58) Field of Classification Search
None
See application file for complete search history.

(56) References Cited

U.S. PATENT DOCUMENTS

| | | | |
|---|---|---|---|
| 3,023,259 A | 2/1962 | Coler et al. | |
| 6,106,973 A * | 8/2000 | Sonozaki | H01M 2/0275 429/127 |
| 2009/0258290 A1 | 10/2009 | Lee et al. | |
| 2011/0076529 A1 * | 3/2011 | Mizuta | H01G 9/08 429/56 |

(Continued)

FOREIGN PATENT DOCUMENTS

| | | |
|---|---|---|
| EP | 0 845 821 A2 | 6/1998 |
| EP | 1 414 083 A1 | 4/2004 |
| JP | 2000-173559 A | 6/2000 |

(Continued)

OTHER PUBLICATIONS

EPO Search Report dated Apr. 30, 2015, for corresponding European Patent application 14198326.2, (8 pages).

(Continued)

*Primary Examiner* — Ula C Ruddock
*Assistant Examiner* — Tony S Chuo
(74) *Attorney, Agent, or Firm* — Lewis Roca Rothgerber Christie LLP

(57) ABSTRACT

A flexible secondary battery includes an electrode assembly and external material surrounding the electrode assembly having at least one bonding portion, wherein the external material is bonded to itself at the at least one bonding portion, and the at least one bonding portion extends in a lengthwise direction of the electrode assembly at an edge of the electrode assembly.

9 Claims, 5 Drawing Sheets

(56) References Cited

U.S. PATENT DOCUMENTS

2012/0058378 A1  3/2012  Lee et al.

FOREIGN PATENT DOCUMENTS

| JP | 2000-223087 | * | 8/2000 | ............. H01M 2/02 |
| KR | 10-2005-0066120 A | | 6/2005 | |
| KR | 10-2010-0071814 A | | 6/2010 | |
| KR | 10-2012-0023491 A | | 3/2012 | |

OTHER PUBLICATIONS

Patent Abstracts of Japan and Machine English Translation of JP 2000-173559 A, dated Jun. 23, 2000, 27 Pages.
EPO Office Action dated Apr. 6, 2017, for corresponding to European Application No. 14198326.2 (6 pages).

* cited by examiner

FLEXIBLE SECONDARY BATTERY HAVING A BONDING PORTION EXTENDING IN A LENGTHWISE DIRECTION

CROSS-REFERENCE TO RELATED APPLICATION

This application claims priority to and the benefit of Korean Patent Application No. 10-2013-0156642, filed on Dec. 16, 2013 in the Korean Intellectual Property Office, the disclosure of which is incorporated herein in its entirety by reference.

BACKGROUND

1. Field

One or more embodiments of the present invention are directed toward a flexible secondary battery.

2. Description of the Related Art

Secondary batteries are batteries that are designed to be repeatedly charged and discharged, unlike primary batteries that are not designed to be repeatedly charged. Because secondary batteries are economical and eco-friendly, their use is being promoted. The kinds of electronic devices in which secondary batteries are used have recently become diverse, and the design of electronic devices has become a significant factor in determining the purchase of the electronic devices.

For example, various wearable computer technologies, in which secondary batteries are used as power supply sources, and various application examples of the same have been developed and disclosed. Also, electronic devices, such as mobile phones or laptop computers, have been designed to have curved surfaces for ergonomic designs.

To increase the application of secondary batteries, the shapes of secondary batteries are being diversified according to the shapes of electronic devices in which the secondary batteries are used, for example a bent or curved shape.

SUMMARY

One or more embodiments of the present invention include a flexible secondary battery.

Additional aspects will be set forth in part in the description which follows and, in part, will be apparent from the description or may be learned by practice of the presented embodiments.

According to one or more embodiments of the present invention, a flexible secondary battery includes: an electrode assembly; and external material surrounding the electrode assembly and having at least one bonding portion, wherein the external material is bonded to itself at the at least one bonding portion, and the at least one bonding portion extends in a lengthwise direction of the electrode assembly at an edge of the electrode assembly.

The external material may include: a first sealing sheet on a first surface of the electrode assembly; a second sealing sheet on a second surface of the electrode assembly that is opposite to the first surface; and a pair of third sealing sheets that respectively surround a pair of side surfaces of the electrode assembly, and the at least one bonding portion may include: a first bonding portion at which an edge of the first sealing sheet and an edge of at least one of the pair of third sealing sheets are bonded to each other; and a second bonding portion at which an edge of the second sealing sheet and an edge of at least one of the pair of third sealing sheets are bonded to each other.

The first bonding portion and the second bonding portion may each extend from one side of the electrode assembly to an opposite side of the electrode assembly along the lengthwise direction, and the first bonding portion and the second bonding portion may be opposite to each other about the electrode assembly.

Each of the first sealing sheet, the second sealing sheet, and the pair of third sealing sheets may include a first insulating layer, a metal layer, and a second insulating layer that are sequentially stacked, and the first insulating layer of the first sealing sheet and the first insulating layer of each of the third sealing sheets may be bonded to each other at the first bonding portion, and the first insulating layer of the second sealing sheet and the first insulating layer of each of the third sealing sheets may be bonded to each other at the second bonding portion.

The first insulating layer of the first sealing sheet may be on the first surface of the electrode assembly, and the first sealing sheet may be folded on itself at the first bonding portion so that a portion of the first insulating layer of the first sealing sheet faces away from the electrode assembly.

The first insulating layer of the second sealing sheet may be on the second surface, and the second sealing sheet may be folded on itself at the second bonding portion so that a portion of the first insulating layer of the second sealing sheet faces away from the electrode assembly.

The second insulating layer of the first sealing sheet may be on the first surface of the electrode assembly, and the second insulating layer of the second sealing sheet may be on the second surface of the electrode assembly.

A separation space may be between at least one of the pair of side surfaces of the electrode assembly and a respective one of the pair of third sealing sheets.

The flexible secondary battery may further include an elastic body at the separation space, wherein the first sealing sheet and the second sealing sheet may be respectively on a first surface and a second surface of the elastic body.

The first bonding portion and the second bonding portion may be over the elastic body.

The first sealing sheet and the second sealing sheet may be bonded to each other at a sealing portion at one side of the electrode assembly along the lengthwise direction of the electrode assembly, and the sealing portion may extend in a widthwise direction perpendicular to the lengthwise direction.

The external material may include a first sealing sheet on a first surface of the electrode assembly, and a second sealing sheet on a second surface of the electrode assembly that is opposite to the first surface, and the second sealing sheet may have a pair of bending portions at respective sides of the electrode assembly along a widthwise direction of the electrode assembly and surrounding a pair of side surfaces of the electrode assembly, and each of the pair of bending portions may overlap respective edges of the first sealing at bonding portions.

Each of the bonding portions may extend from one side of the electrode assembly to an opposite side of the electrode assembly along the lengthwise direction of the electrode assembly.

A layer of each of the first sealing sheet and the second sealing sheet including the same materials may be bonded to each other at the bonding portions.

The first sealing sheet may be folded on itself at each of the bonding portions so that a portion of the layer on the first surface of the electrode assembly face away from the electrode assembly.

A separation space may be between each of the pair of side surfaces of the electrode assembly and respective ones of the pair of bending portions.

An elastic body may be at the separation space, and the bonding portion may be over the elastic body.

The electrode assembly may include a positive electrode plate, a negative electrode plate, and a separator between the positive electrode plate and the negative electrode plate, and the external material may include a sealing sheet surrounding the electrode assembly in a clockwise or counterclockwise direction, and one edge portion and another edge portion of the sealing sheet may be bonded to each other at the bonding portion.

The sealing sheet may overlap itself at one side and another side of the electrode assembly along a lengthwise direction of the electrode assembly, and the overlapping layers of the sealing sheet may be bonded to each other to at sealing portions.

A layer of each of one side and another side of the sealing sheet including the same materials may be bonded to each other at the bonding portion.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
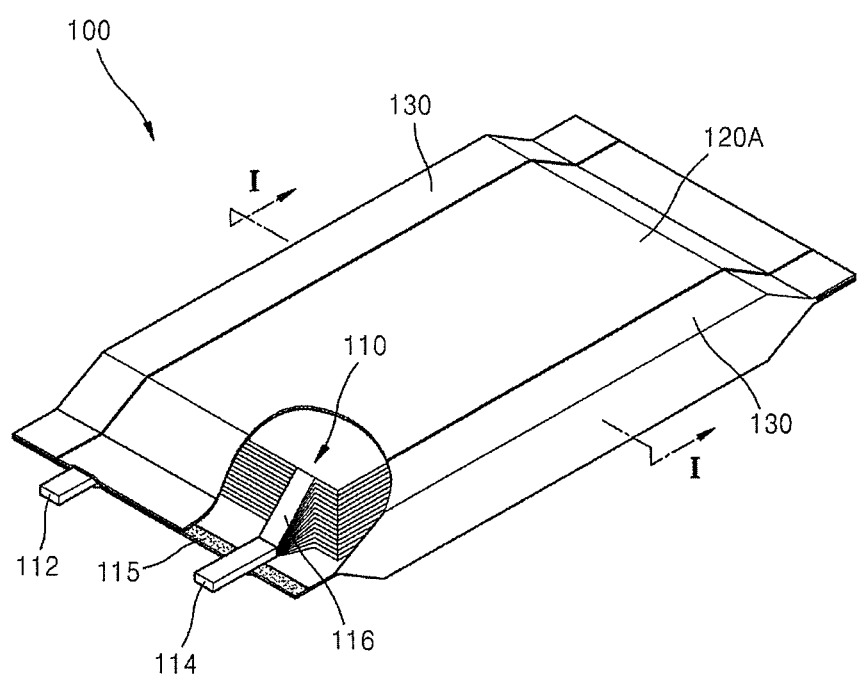
FIG. 1 is a partially cut away perspective view of a flexible secondary battery according to an embodiment of the present invention.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description.

As the invention allows for various changes and numerous embodiments, example embodiments will be illustrated in the drawings and described in detail in the written description. The aspects and features of the present invention, and a method of achieving them, will become apparent from the embodiments that will be described below together with the drawings. However, embodiments of the present invention are not limited to the following embodiments but may be realized in various shapes and/or forms.

A flexible secondary battery will be described below in more detail with reference to the accompanying drawings. Those components that are the same or substantially the same are designated by the same reference numeral regardless of the figure number and redundant explanations thereof may be omitted.

It will be understood that although the terms "first", "second", etc. may be used herein to describe various components, these components should not be limited by these terms. These terms are only used to distinguish one component from another.

As used herein, the singular forms "a", "an", and "the" are intended to include the plural forms as well, unless the context clearly indicates otherwise.

It will be further understood that the terms "includes", "including", "comprises", and/or "comprising" used herein specify the presence of stated features or components but do not preclude the presence or addition of one or more other additional features or components.

It will be understood that when a layer, region, or component is referred to as being "on" or "formed on," another layer, region, or component, it can be directly or indirectly on or formed on the other layer, region, or component. That is, for example, intervening layers, regions, or components may also be present. Also, spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" or "over" the other elements or features. Thus, the term "below" may encompass both an orientation of above and below. The device may be otherwise oriented (rotated 90 degrees or at other orientations), and the spatially relative descriptors used herein should be interpreted accordingly.

Sizes and thicknesses of elements in the drawings may be exaggerated for convenience of explanation. In other words, because sizes and thicknesses of components in the drawings are arbitrarily illustrated for convenience of explanation, the following embodiments are not limited thereto. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the present invention refers to "one or more embodiments of the present invention."

Figure 2:
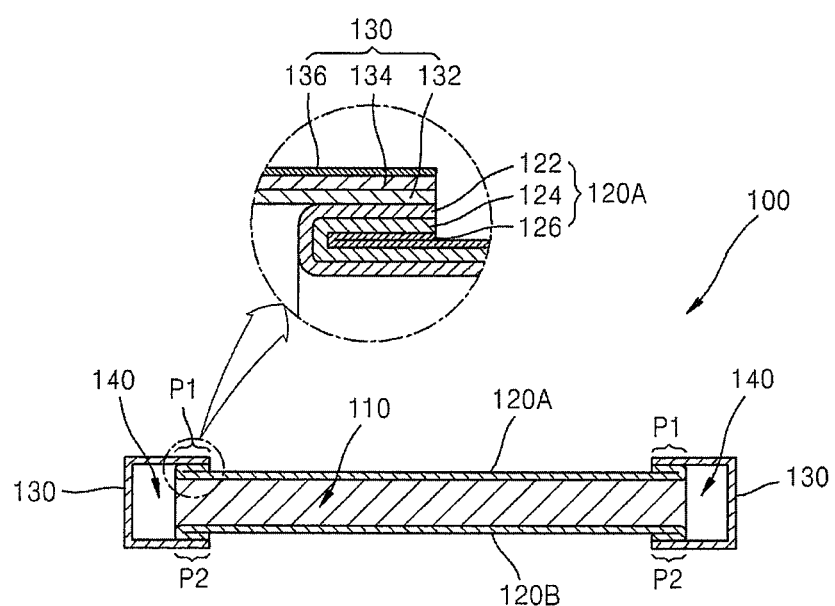
FIG. 2 is a cross-sectional view taken along the line I-I of FIG. 1.

FIG. 1 is a partially exploded perspective view of a flexible secondary battery 100 according to an embodiment of the present invention, and FIG. 2 is a cross-sectional view of the flexible secondary battery 100 taken along the line I-I of FIG. 1.

Referring to FIGS. 1 and 2, the flexible secondary battery 100 according to an embodiment of the present invention may include an electrode assembly 110 and external materials, namely, first and second sealing sheets 120A and 120B and a pair of third sealing sheets 130 that seal the electrode assembly 110 and have at least one bonding portion, namely, first and second bonding portions P1 and P2. For example, the external materials may include the first sealing sheet 120A on (e.g., attached onto) a first surface of the electrode assembly 110, the second sealing sheet 120B on (e.g., attached onto) a second surface of the electrode assembly 110 that is opposite to the first surface, and the pair of third sealing sheets 130 that respectively surround a pair of side surfaces of the electrode assembly 110.

The electrode assembly 110 may include a positive electrode plate, a negative electrode plate, and a separator therebetween. For example, the electrode assembly 110 may be formed by sequentially stacking the positive electrode plate, the separator, and the negative electrode plate.

The positive electrode plate may include a positive electrode active material-coated portion onto which a positive electrode active material is coated and a positive electrode non-coated portion onto which the positive electrode active material is not coated. The positive electrode active material-coated portion may be formed by coating the positive electrode active material onto a portion of at least one surface of an aluminum plate, for example, and the remaining portion of the aluminum plate, onto which the positive electrode active material is not coated, may be the positive electrode non-coated portion. The positive electrode active material may be a lithium-containing transition metal oxide or a lithium chalcogenide compound, such as $LiCoO_2$, $LiNiO_2$, $LiMnO_2$, or $LiMnO_4$.

The negative electrode plate may include a negative electrode active material-coated portion onto which a negative electrode active material is coated and a negative electrode non-coated portion onto which the negative electrode active material is not coated. The negative electrode active material may be formed by coating the negative electrode active material onto a portion of at least one surface of a copper plate, for example, and the remaining portion of the copper plate, onto which the negative electrode active material is not coated, may be the negative electrode non-coated portion. The negative electrode active material may be a carbon material, such as crystalline carbon, amorphous carbon, a carbon complex, or a carbon fiber, or may be a lithium metal or a lithium alloy.

The separator may be manufactured by coating poly (vinylidene fluoride-hexafluoropropene) (PVDF-HFP) co-polymer onto a substrate including one selected from the group consisting of polyethylene (PE), polystyrene (PS), polypropylene (PP), and a co-polymer of PE and PP, for example. However, embodiments of the present invention are not limited thereto.

A first electrode tab 112 and a second electrode tab 114 may be electrically coupled to (e.g., electrically connected to) the electrode assembly 110. For example, a current collector 116 may be attached to the positive electrode non-coated portion and the negative electrode non-coated portion, respectively, and the current collector 116 may be coupled to (e.g., connected to) the first electrode tab 112 or the second electrode tab 114. The first electrode tab 112 and the second electrode tab 114 may be exposed to outside the flexible secondary battery 100 through a sealing portion 115 at which the first sealing sheet 120A and the second sealing sheet 120B are bonded to each other, and the electrode assembly 110 may be charged and discharged via the first electrode tab 112 and the second electrode tab 114.

The first sealing sheet 120A may be attached onto the first surface of the electrode assembly 110 so as to prevent permeation of external moisture or oxygen therethrough. The first sealing sheet 120A may include a first insulating layer 122, a metal layer 124, and a second insulating layer 126, which are sequentially stacked.

The first insulating layer 122 and the second insulating layer 126 may be formed of PP, polyethylene terephthalate (PET), or nylon, and the metal layer 124 may be formed of aluminum, steel, or stainless steel. However, embodiments of the present invention are not limited thereto. For example, the first sealing sheet 120A may have a three-layer structure including the first insulating layer 122 formed of PP, the metal layer 124 formed of aluminum, and the second insulating layer 126 formed of PET.

The second sealing sheet 120B may have the same or substantially the same configuration as that of the first sealing sheet 120A and may be attached onto the second surface of the electrode assembly 110 that is opposite to the first surface of the electrode assembly 110 so as to prevent permeation of external moisture or oxygen therethrough.

The first sealing sheet 120A and the second sealing sheet 120B may be bonded to each other at least at one side of the flexible secondary battery 100 so that the sealing portion 115 may be formed. The sealing portion 115 may be formed along a second direction that is substantially perpendicular to a first direction in which the first bonding portion P1 and the second bonding portion P2 extend. Here, the second direction is a widthwise direction of the electrode assembly 110, and the first direction is a lengthwise direction of the electrode assembly 110.

Also, the first sealing sheet 120A and the second sealing sheet 120B may be bonded to each other at another side of the flexible secondary battery 100 that is opposite to the one side of the flexible secondary battery 100 at which the sealing portion 115 is formed. However, the first sealing sheet 120A and the second sealing sheet 120B may be integrally or continuously formed, and the first sealing sheet 120A and second sealing sheet 120B may be folded at the other side of the flexible secondary battery 100 to surround the electrode assembly 110.

The pair of third sealing sheets 130 may respectively surround a pair of opposite side surfaces of the electrode assembly 110 which each extend between (e.g., connect) the first surface and the second surface of the electrode assembly 110. For example, the first bonding portion P1 may be formed where each of the pair of third sealing sheets 130 overlaps an edge of the first sealing sheet 120A, and the second bonding portion P2 may be formed where each of the pair of third sealing sheets 130 overlaps an edge of the second sealing sheet 120B. Thus, the pair of third sealing sheets 130 together with the first sealing sheet 120A and the second sealing sheet 120B may seal the electrode assembly 110, and an electrolyte may be accommodated in the flexible secondary battery 100.

Each of the third sealing sheets 130 may include a first insulating layer 132, a metal layer 134, and a second insulating layer 136, which are sequentially stacked. For example, each third sealing sheet 130 may have a three-layer structure of the first insulating layer 132 formed of PP, the metal layer 134 formed of aluminum, and the second insulating layer 136 formed of PET. That is, the third sealing sheet 130 may have the same or substantially the same configuration as that of the first sealing sheet 120A and the second sealing sheet 120B.

A layer of each of the third sealing sheets 130 and the first sealing sheet 120A formed of the same materials may contact each other and may be bonded to each other at the first bonding portion P1. A layer of each of the third sealing sheets 130 and the second sealing sheet 120B formed of the same materials may contact each other and may be bonded to each other at the second bonding portion P2. For example, the first bonding portion P1 may be formed by bonding the first insulating layer 122 of the first sealing sheet 120A to the first insulating layer 132 of each of the third sealing sheets 130.

For example, as illustrated in FIG. 2, when the first insulating layer 122 of the first sealing sheet 120A is attached onto the first surface of the electrode assembly 110, the first sealing sheet 120A may be folded on itself (e.g., folded by 180°) at the first bonding portion P1 so that a portion of the first insulating layer 122 may face an outer side of the first sealing sheet 120A (e.g., may face away from the electrode assembly 110). That is, the first insulating layer 122 of the first sealing sheet 120A and the first insulating layer 132 of each of the third insulating sheets 130 may contact each other and may be bonded to each other at the first bonding portion P1.

Both the first insulating layer 122 of the first sealing sheet 120A and the first insulating layer 132 of each third sealing sheet 130 may be formed of PP. When layers formed of the same materials are bonded to each other, the layers have an excellent bonding property and have the same thermal expansion coefficients. Thus, a separation phenomenon may be efficiently reduced or prevented from occurring due to thermal expansion at a bonded interface.

In this manner, when the first insulating layer 122 of the second sealing sheet 120B is attached onto the second surface of the electrode assembly 110, a portion of the second sealing sheet 120B may be folded on itself (e.g., folded by 180°) at the second bonding portion P2 so that the first insulating layer 122 of the second sealing sheet 120B faces an outer side of the second sealing sheet 120B (e.g., faces away from the electrode assembly 110), and the first insulating layer 132 of each third sealing sheet 130 may be bonded to the exposed first insulating layer 122 of the second sealing sheet 120B.

The first bonding portion P1 and the second bonding portion P2 may extend from one side to another side of the flexible secondary battery 100 along the first direction (e.g., along the lengthwise direction of the electrode assembly 110) so that the flexible secondary battery 100 may be efficiently sealed. Here, the first direction is a lengthwise direction of the flexible secondary battery 100 (e.g., is the lengthwise direction of the electrode assembly 110) and is substantially perpendicular to a bending direction of the flexible secondary battery 100. The flexible secondary battery 100 may be bent in a thickness direction of the flexible secondary battery 100 (e.g., in a direction substantially perpendicular to the first direction and the second direction of the flexible secondary battery 100).

The first bonding portion P1 and the second boding portion P2 may be formed at a position in which they overlap or are over the electrode assembly 110. For example, the first bonding portion P1 may be on the first surface of the electrode assembly 110, and the second bonding portion P2 may be on the second surface of the electrode assembly 110. Also, the first bonding portion P1 and the second bonding portion P2 may be symmetrical (e.g., may be opposite to each other) about the electrode assembly 110. In this way, by forming the first bonding portion P1 and the second bonding portion P2 at a position at which they overlap the electrode assembly 110, even when the flexible secondary battery 100 is bent in a direction perpendicular to the first direction, stress concentration on the first bonding portion P1 and the second bonding portion P2 may be alleviated so that the stability of the flexible secondary battery 100 may be maintained.

Also, the first bonding portion P1 and the second bonding portion P2 are formed to overlap the electrode assembly 110 so that the size of the flexible secondary battery 100 may be reduced compared to a comparative example in which the first sealing sheet 120A and the second sealing sheet 120B are bonded to each other by extending from both sides to an outer side of the electrode assembly 110 along the widthwise direction.

A separation space 140 may be formed between each of the side surfaces of the electrode assembly 110 and respective ones of the pair of third sealing sheets 130. The separation spaces 140 may serve or act as a buffer when the flexible secondary battery 100 is bent. When the flexible secondary battery 100 is bent, the separation spaces 140 may provide a space for slipping of the plurality of layers included in the electrode assembly 110.

Figure 3:
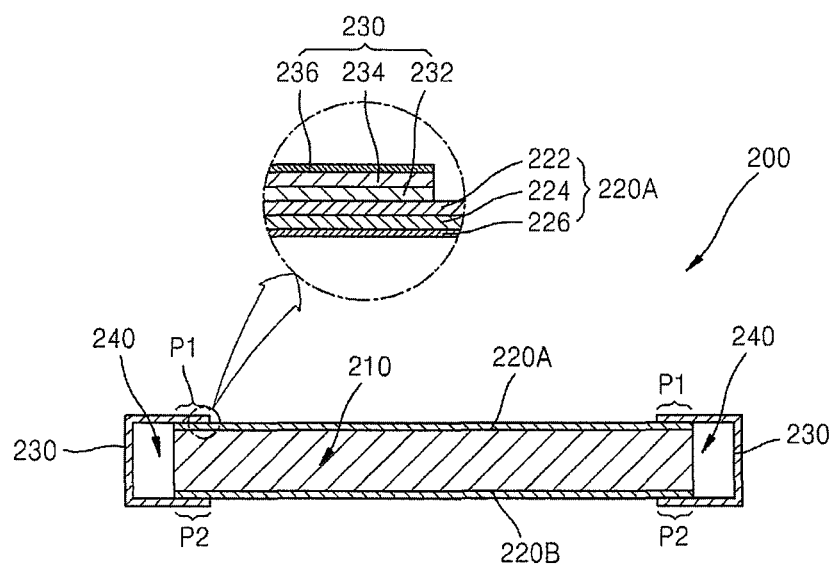
FIG. 3 is a cross-sectional view of a modified example of the secondary battery illustrated in FIG. 1.

FIG. 3 is a cross-sectional view of a modified example of the flexible secondary battery 100 shown in FIG. 1. FIG. 3 illustrates a similar cross-sectional view as illustrated in FIG. 2 for convenience of explanation.

Referring to FIG. 3, a flexible secondary battery 200 may include an electrode assembly 210, a first sealing sheet 220A on (e.g., attached onto) a first surface of the electrode assembly 210, a second sealing sheet 220B on (e.g., attached onto) a second surface of the electrode assembly 210, and a pair of third sealing sheets 230 that respectively surround a pair of side surfaces of the electrode assembly 210.

The electrode assembly 210 is substantially the same or the same as the electrode assembly 110 illustrated in FIGS. 1 and 2 and, thus, may not be repeatedly described.

Each of the first sealing sheet 220A and the second sealing sheet 220B includes a first insulating layer 222, a metal layer 224, and a second insulating layer 226, which are sequentially stacked. Each of the third sealing sheets 230 includes a first insulating layer 232, a metal layer 234, and a second insulating layer 236, which are sequentially stacked. Also, the first insulating layer 232, the metal layer 234, and the second insulating layer 236 of each third sealing sheet 230 may be formed of the same materials as those of the first insulating layer 222, the metal layer 224, and the second insulating layer 226 of the first sealing sheet 220A and the second sealing sheet 220B, respectively.

A first bonding portion P1 may be formed where each of the pair of third sealing sheets 230 overlaps an edge of the first sealing sheet 220A, and a second bonding portion P2 may be formed where each of the pair of third sealing sheets 230 overlaps an edge of the second sealing sheet 220B.

Each of the first bonding portion P1 and the second bonding portion P2 may be formed at a position at which they overlap the electrode assembly 210. Thus, even when the flexible secondary battery 200 is repeatedly bent, a stress concentration phenomenon at the first bonding portion P1 and the second bonding portion P2 may be alleviated so that the stability of the flexible secondary battery 200 may be maintained.

Also, a layer of each of the third sealing sheets 230 and the first sealing sheet 220A formed of the same materials may contact each other and may be bonded to each other at the first bonding portion P1. A layer of each of the third sealing sheets 230 and the second sealing sheet 220B formed of the same materials may contact each other and may be bonded to each other at the second bonding portion P2.

For example, the second insulating layer 226 of each of the first sealing sheet 220A and the second sealing sheet 220B may be on (e.g., attached to) the electrode assembly 210 so that the first insulating layer 222 of each of the first sealing sheet 220A and the second sealing sheet 220B may face an outer side of each of the first sealing sheet 220A and the second sealing sheet 220B (e.g., the first insulating layer 222 of each of the first sealing sheet 220A and the second sealing sheet 220B may face away from the electrode assembly 210). Also, widths of the electrode assembly 210, the first sealing sheet 220A, and the second sealing sheet 220B along the second direction that is substantially perpendicular to the first direction, that is, a direction in which the first bonding portion P1 and the second bonding portion P2 are formed may be the same. Thus, the first insulating layers 222 of each of the first sealing sheet 220A and the second sealing sheet 220B and the first insulating layer 232 of each of the third sealing sheets 230 may be bonded to each other through a more simple process.

Also, a separation space 240 is formed between each of the pair of side surfaces of the electrode assembly 210 and respective ones of the pair of the third sealing sheets 230 so that, when the flexible secondary battery 200 is bent, there is a space in which a plurality of layers included in the electrode assembly 210 may slip or enter.

Figure 4:
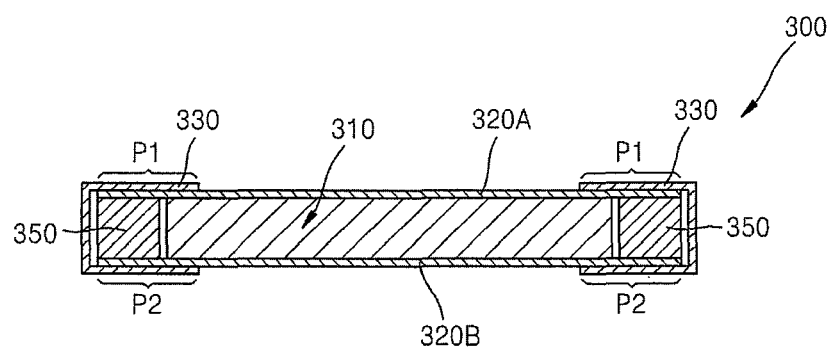
FIG. 4 is a cross-sectional view of another modified example of the secondary battery illustrated in FIG. 1.

FIG. 4 is a cross-sectional view of another modified example of the flexible secondary battery 100 of FIG. 1. FIG. 4 illustrates a similar cross-sectional view as illustrated in FIG. 2 for convenience of explanation.

Referring to FIG. 4, a flexible secondary battery 300 may include an electrode assembly 310, a first sealing sheet 320A on (e.g., attached onto) a first surface of the electrode assembly 310, a second sealing sheet 320B on (e.g., attached onto) a second surface of the electrode assembly 310, and a pair of third sealing sheets 330 that respectively surround a pair of side surfaces of the electrode assembly 310.

A first bonding portion P1 may be formed where each of the pair of third sealing sheets 330 overlaps an edge of the first sealing sheet 320A, and a second bonding portion P2 may be formed where each of the pair of third sealing sheets 330 overlaps an edge of the second sealing sheet 320B. A Layer of each of the third sealing sheets 330 and the first sealing sheet 320A formed of the same materials may contact each other and may be bonded to each other at the first bonding portion P1. A layer of each of the third sealing sheets 330 and the second sealing sheet 320B formed of the same material may contact each other and may be bonded to each other at the second bonding portion P2.

Also, an elastic body 350 may be between each of the pair of side surfaces of the electrode assembly 310 and the respective ones of the sealing sheets 330. The elastic body 350 may be formed of a flexible material and does not cause a chemical reaction with an electrolyte accommodated in the flexible secondary battery 300 (e.g., the elastic body 350 may not be chemically reactive with the electrolyte). For example, the elastic body 350 may be formed of silicon, PP, PE, or polyolefin. However, embodiments of the present invention are not limited thereto.

The first sealing sheet 320A and the second sealing sheet 320B may extend to a position at which they overlap the elastic body 350 and may be on (e.g., attached onto) first and second surfaces of the elastic body 350, respectively. As a result, the first bonding portion P1 and the second bonding portion P2 may extend from a position in which they overlap or are over the electrode assembly 310 to a position in which they overlap or are over the elastic body 350 as well.

In this way, by forming the first bonding portion P1 and the second bonding portion P2 on the first and second surfaces of the flexible elastic body 350 as well as the first and second surfaces of the electrode assembly 310, stress generated when the flexible secondary battery 300 is repeatedly bent may be uniformly dispersed so that stress concentrations at the first bonding portion P1 and the second bonding portion P2 may be efficiently alleviated, and the stability of the flexible secondary battery 300 may be maintained.

Also, the elastic body 350 is spaced from the electrode assembly 310 so that, when the flexible secondary battery 300 is bent, a space, in which a plurality of layers included in the electrode assembly 310 may slip or enter, may be provided.

Figure 5:
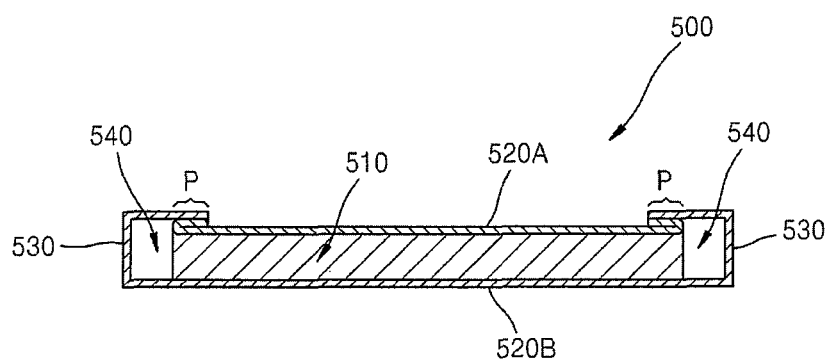
FIG. 5 is a cross-sectional view of a flexible secondary battery according to another embodiment of the present invention.

FIG. 5 is a cross-sectional view of a flexible secondary battery 500 according to another embodiment of the present invention. FIG. 5 illustrates a similar cross-sectional view as illustrated in FIG. 2 for convenience of explanation.

Referring to FIG. 5, the flexible secondary battery 500 may include an electrode assembly 510, and external materials, namely, first and second sealing sheets 520A and 520B that seal the electrode assembly 510 and have at least one bonding portion P. For example, the external materials, namely, the first and second sealing sheets 520A and 520B may include the first sealing sheet 520A on (e.g., attached onto) a first surface of the electrode assembly 510 and the second sealing sheet 520B on (e.g., attached onto) a second surface of the electrode assembly 510.

The electrode assembly 510 and the first sealing sheet 520A are substantially the same or the same as the electrode assembly 110 and the first sealing sheet 120A illustrated in FIGS. 1 and 2 and, thus, may not be repeatedly described.

The second sealing sheet 520B may extend to both sides of the electrode assembly 510 along a widthwise direction of the electrode assembly 510 and may have a pair of bending portions 530 bent to surround a pair of side surfaces of the electrode assembly 510. In this case, the pair of bending portions 530 may be spaced from the pair of side surfaces of the electrode assembly 510. Thus, a separation space 540 may be formed between each of the pair of bending portions 530 and respective ones of the side surfaces of the electrode assembly 510.

The pair of bending portions 530 may overlap opposite edges of the first sealing sheet 520A, and the bending portions 530 may be respectively bonded to the first sealing sheet 520A so that a pair of bonding portions P may be formed. That is, the flexible secondary battery 500 illustrated in FIG. 5 may have fewer sealing sheets when compared to the flexible secondary battery 100 illustrated in FIGS. 1 and 2.

The pair of bonding portions P may be formed at a position in which they overlap or are over the electrode assembly 510 and may extend along a lengthwise direction of the electrode assembly 510. Thus, even when the flexible secondary battery 500 is repeatedly bent, the stability of the flexible secondary battery 500 may be maintained.

Also, the first sealing sheet 520A and the second sealing sheet 520B may each have a three-layer structure including a first insulating layer formed of PP, a metal layer formed of aluminum, and a second insulating layer formed of PET, for example. A layer of each of the first sealing sheet 520A and the second sealing sheet 520B formed of the same materials may contact each other and may be bonded to each other at the bonding portions P. For example, the first insulating layer of the first sealing sheet 520A may be bonded to the first insulating layer of the second sealing sheet 520B.

For example, when the first insulating layer of the first sealing sheet 520A is attached onto the first surface of the electrode assembly 510, a portion of the first sealing sheet 520A may be folded on itself (e.g., folded by 180°) at the bonding portions P so that the first insulating layer of the first sealing sheet 520A may face an outer side of the first sealing sheet 520A (e.g., may face away from the electrode assembly 510). Thus, because the first sealing sheet 520A and the second sealing sheet 520B are bonded to each other at layers formed of the same materials, the first sealing sheet 520A and the second sealing sheet 520B may have an excellent bonding property. However, embodiments of the present invention are not limited thereto, and as illustrated in FIG. 3, in an embodiment in which the first sealing sheet 520A is not folded, the same layer of the first sealing sheet 520A as that of the second sealing sheet 520B may be bonded to each other.

Also, an elastic body (see 350 of FIG. 4) may be further included in the separation space 540. In this embodiment, the bonding portions P may extend to overlap or be over the elastic body (see 350 of FIG. 4).

Figure 6:
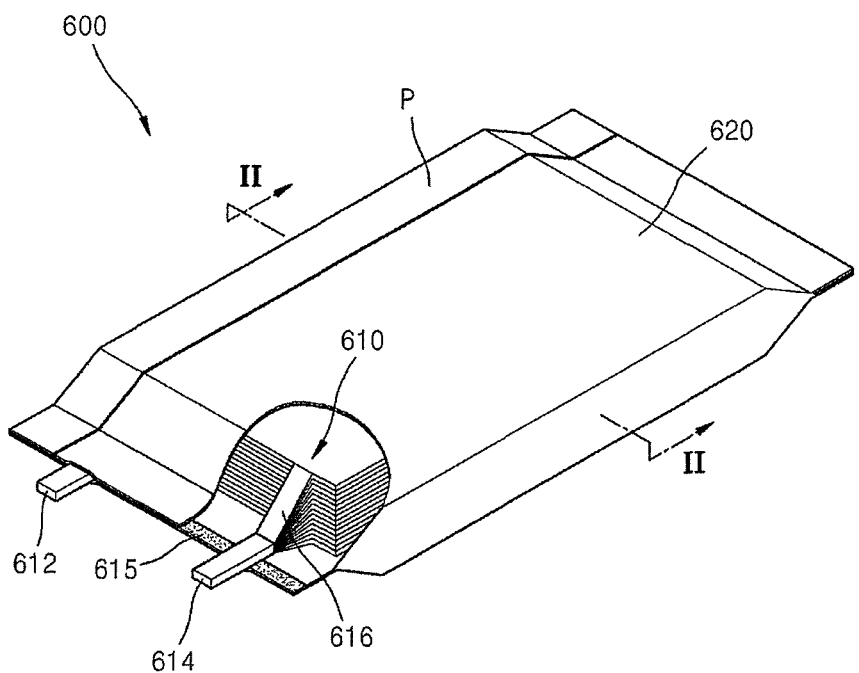
FIG. 6 is a partially cut away perspective view of a flexible secondary battery according to another embodiment of the present invention.
Figure 7:
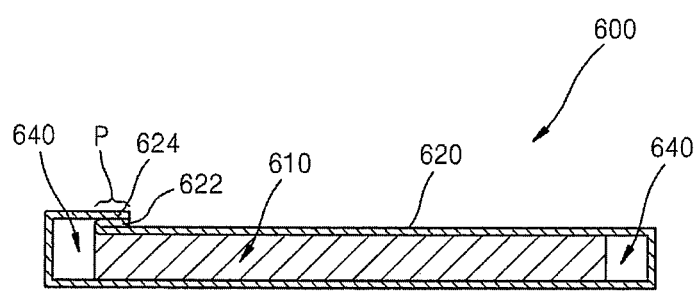
FIG. 7 is a cross-sectional view taken along the line II-II of FIG. 6.

FIG. 6 is a partially exploded perspective view of a flexible secondary battery 600 according to another embodiment of the present invention, and FIG. 7 is a cross-sectional view of taken along the line II-II of FIG. 6.

Referring to FIGS. 6 and 7, the flexible secondary battery 600 may include an electrode assembly 610 and a sealing sheet 620 that is an external material sealing the electrode assembly 610.

The electrode assembly 610 may include a positive electrode plate, a negative electrode plate, and a separator therebetween. A current collector 616 may be formed on each of the positive electrode plate and the negative electrode plate. The current collector 616 formed on each of the positive electrode plate and the negative electrode plate may be coupled to (e.g., connected to) a first electrode tab 612 or a second electrode tab 614.

The sealing sheet 620 may have a three-layer structure including a first insulating layer formed of PP, a metal layer formed of aluminum, and a second insulating layer formed of PET, for example.

The sealing sheet 620 may surround the electrode assembly 610 in a clockwise or counterclockwise direction, and one side 622 (e.g., one edge) and another side 624 (e.g., another edge) of the sealing sheet 620 overlap each other so that the sealing sheet 620 may seal the electrode assembly 610.

For example, the sealing sheet 620 may surround one side surface of the electrode assembly 610, may be on (e.g., attached onto) a first surface of the electrode assembly 610, may be on (e.g., attached onto) a second surface of the electrode assembly 610, and may surround another side surface of the electrode assembly 610 such that the one side 622 and the other side 624 of the sealing sheet 620 may be bonded to each other.

The one side 622 and the other side 624 of the sealing sheet 620 are bonded to each other and form a bonding portion P. The bonding portion P may be formed at a position at which the bonding portion P overlaps or is over the electrode assembly 610, for example, on or over the first surface of the electrode assembly 610. Also, the bonding portion P may extend along a first direction, that is, a lengthwise direction of the electrode assembly 610. Thus, even when the flexible secondary battery 600 is repeatedly bent, stress applied to the bonding portion P is alleviated so that the stability of the flexible secondary battery 600 may be maintained.

Also, a same layer of the one side 622 and the other side 624 of the sealing sheet 620 may contact each other and may be bonded to each other at the bonding portion P. To this end, a portion of the one side 622 may be folded on itself (e.g., folded by 180°) at the bonding portion P so that a surface of the sealing sheet 620 attached onto the first surface of the electrode assembly 610 may face an outer side of the sealing sheet 620 (e.g., may face away from the electrode assembly 610).

The sealing sheet 620 that surrounds the electrode assembly 610 overlaps itself at opposite sides of the flexible secondary battery 600 along a widthwise direction of the flexible secondary battery 600 such that two layers overlap each other. The two overlapping layers are bonded to each other so as to seal the flexible secondary battery 600 such that a sealing portion 615 may be formed.

Also, a separation space 640 may be formed between the sealing sheet 620 and each of a pair of side surfaces of the electrode assembly 610. The separation spaces 640 may serve or act as a buffer when the flexible secondary battery 600 is repeatedly bent. Also, when the flexible secondary battery 600 is bent, a space, into which a plurality of layers included in the electrode assembly 610 may slip, may be provided at the separation spaces 640.

As described above, according to the one or more of the above embodiments of the present invention, the stability of a flexible secondary battery may be maintained even when it is repeatedly bent.

It should be understood that the example embodiments described herein should be considered in a descriptive sense only and not for purposes of limitation. Descriptions of features or aspects within each embodiment should typically be considered as available for other similar features or aspects in other embodiments.

While one or more embodiments of the present invention have been described with reference to the figures, it will be understood by those of ordinary skill in the art that various changes in form and details may be made therein without departing from the spirit and scope of the present invention as defined by the following claims and their equivalents.

What is claimed is:

1. A flexible secondary battery comprising:
   an electrode assembly;
   a first sealing sheet on a first surface of the electrode assembly, a portion of the first sealing sheet extending along a lengthwise edge of the electrode assembly and folded on itself such that an inner surface of the first sealing sheet faces away from the electrode assembly;
   a second sealing sheet on a second surface of the electrode assembly opposite to the first surface, a portion of the second sealing sheet extending along the lengthwise edge of the electrode assembly and folded on itself such that an inner surface of the second sealing sheet faces away from the electrode assembly; and
   a pair of third sealing sheets that respectively cover a pair of side surfaces of the electrode assembly,
   wherein an inner surface of one of the third sealing sheets facing the electrode assembly is bonded to the inner surfaces of the first and second sealing sheets at where they are folded on themselves to form a first bonding portion and a second bonding portion, respectively,
   wherein the first bonding portion and the second bonding portion overlap the electrode assembly at the edge of the electrode assembly, and
   wherein the inner surface of the first sealing sheet, the inner surface of the second sealing sheet and the inner surfaces of the thirds sealing sheets comprise the same material.

2. The flexible secondary battery of claim 1, wherein the first bonding portion and the second bonding portion each extend from one side of the electrode assembly to an opposite side of the electrode assembly along the lengthwise direction, and wherein the first bonding portion and the second bonding portion are opposite to each other about the electrode assembly.

3. The flexible secondary battery of claim 1, wherein each of the first sealing sheet, the second sealing sheet, and the pair of third sealing sheets comprises a first insulating layer, a metal layer, and a second insulating layer that are sequentially stacked, wherein the first insulating layer of the first sealing sheet and the first insulating layer of each of the third sealing sheets are bonded to each other at the first bonding portion, and wherein the first insulating layer of the second sealing sheet and the first insulating layer of each of the third sealing sheets are bonded to each other at the second bonding portion.

4. The flexible secondary battery of claim 3, wherein the first insulating layer of the first sealing sheet is on the first surface of the electrode assembly, and the first sealing sheet is folded on itself at the first bonding portion so that a portion of the first insulating layer of the first sealing sheet faces away from the electrode assembly.

5. The flexible secondary battery of claim 4, wherein the first insulating layer of the second sealing sheet is on the second surface of the electrode assembly, and the second sealing sheet is folded on itself at the second bonding portion so that a portion of the first insulating layer of the second sealing sheet faces away from the electrode assembly.

6. The flexible secondary battery of claim 1, wherein a separation space is between at least one of the pair of side surfaces of the electrode assembly and a respective one of the pair of third sealing sheets.

7. The flexible secondary battery of claim 6, further comprising an elastic body at the separation space, wherein the first sealing sheet and the second sealing sheet are respectively on a first surface and a second surface of the elastic body.

8. The flexible secondary battery of claim 7, wherein the first bonding portion and the second bonding portion are over at least a portion of the elastic body.

9. The flexible secondary battery of claim 1, wherein the electrode assembly comprises a positive electrode plate, a negative electrode plate, and a separator between the positive electrode plate and the negative electrode plate.

* * * * *